US010956468B2

(12) United States Patent
Codella et al.

(10) Patent No.: US 10,956,468 B2
(45) Date of Patent: Mar. 23, 2021

(54) # COGNITIVE TEMPLATE QUESTION SYSTEM

(71) Applicant: INTERNATIONAL BUSINESS MACHINES CORPORATION, Armonk, NY (US)

(72) Inventors: Christopher F. Codella, LaGrangeville, NY (US); Jeb R. Linton, Manassas, VA (US); Charles Palmer, Hanover, NH (US); Gregory A. Porpora, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 15/828,401

(22) Filed: Nov. 30, 2017

(65) Prior Publication Data

US 2019/0163814 A1 May 30, 2019

(51) Int. Cl.

*G06F 16/33* (2019.01)
*G06F 40/186* (2020.01)
*G06N 20/00* (2019.01)
*G06F 16/36* (2019.01)

(52) U.S. Cl.

CPC .......... *G06F 16/334* (2019.01); *G06F 40/186* (2020.01); *G06F 16/367* (2019.01); *G06N 20/00* (2019.01)

(58) Field of Classification Search

CPC ............................. G06F 16/334; G06F 40/186
See application file for complete search history.

(56) References Cited

U.S. PATENT DOCUMENTS

| | | | | |
|---|---|---|---|---|
| 8,955,058 B2 | 2/2015 | Castro et al. | | |
| 9,117,374 B2 | 8/2015 | Nguyen | | |
| 2008/0104065 A1 | 5/2008 | Agarwal et al. | | |
| 2010/0081120 A1* | 4/2010 | Nanjiani | G09B 7/02 | 434/322 |
| 2010/0131463 A1 | 5/2010 | Smeed et al. | | |
| 2015/0199400 A1 | 7/2015 | Wu | | |

(Continued)

FOREIGN PATENT DOCUMENTS

| | | |
|---|---|---|
| CN | 104111953 A | 10/2014 |
| WO | 2005073908 A1 | 8/2005 |

OTHER PUBLICATIONS

Mell et al., "The NIST Definition of Cloud Computing," National Institute of Standards and Technology, Sep. 2011, p. 1-3, Special Publication 800-145.

*Primary Examiner* — Hau H Hoang
(74) *Attorney, Agent, or Firm* — L. Jeffrey Kelly

(57) ABSTRACT

A method, computer system, and a computer program product for cognitive template question formation and execution is provided. The present invention may include receiving a dynamic template question. The present invention may also include mapping the received template question to a type. The present invention may then include mapping the received template question to a data source. The present invention may further include forming a template question based on the mapped template question. The present invention may also include triggering, in response to a triggering event, a query based on the formed template question. The present invention may then include executing the triggered query.

20 Claims, 6 Drawing Sheets

(56) References Cited

U.S. PATENT DOCUMENTS

| | | | | |
|---|---|---|---|---|
| 2016/0034578 | A1* | 2/2016 | Wang | G06F 16/951 707/722 |
| 2016/0070708 | A1* | 3/2016 | Labbi | G06F 16/24578 707/723 |
| 2016/0179922 | A1 | 6/2016 | Crupi et al. | |
| 2017/0032689 | A1 | 2/2017 | Beason et al. | |

* cited by examiner

COGNITIVE TEMPLATE QUESTION SYSTEM

BACKGROUND

The present invention relates generally to the field of computing, and more particularly to cognitive computing. Cognitive analytics may use a significant amount of stored data and real-time data from various domains. Cyber security, financial markets, medicine and industrial markets are some domains that may generate and provide data to a cognitive analytic system.

SUMMARY

Embodiments of the present invention disclose a method, computer system, and a computer program product for cognitive template question formation and execution. The present invention may include receiving a dynamic template question. The present invention may also include mapping the received template question to a type. The present invention may then include mapping the received template question to a data source. The present invention may further include forming a template question based on the mapped template question. The present invention may also include triggering, in response to a triggering event, a query based on the formed template question. The present invention may then include executing the triggered query.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
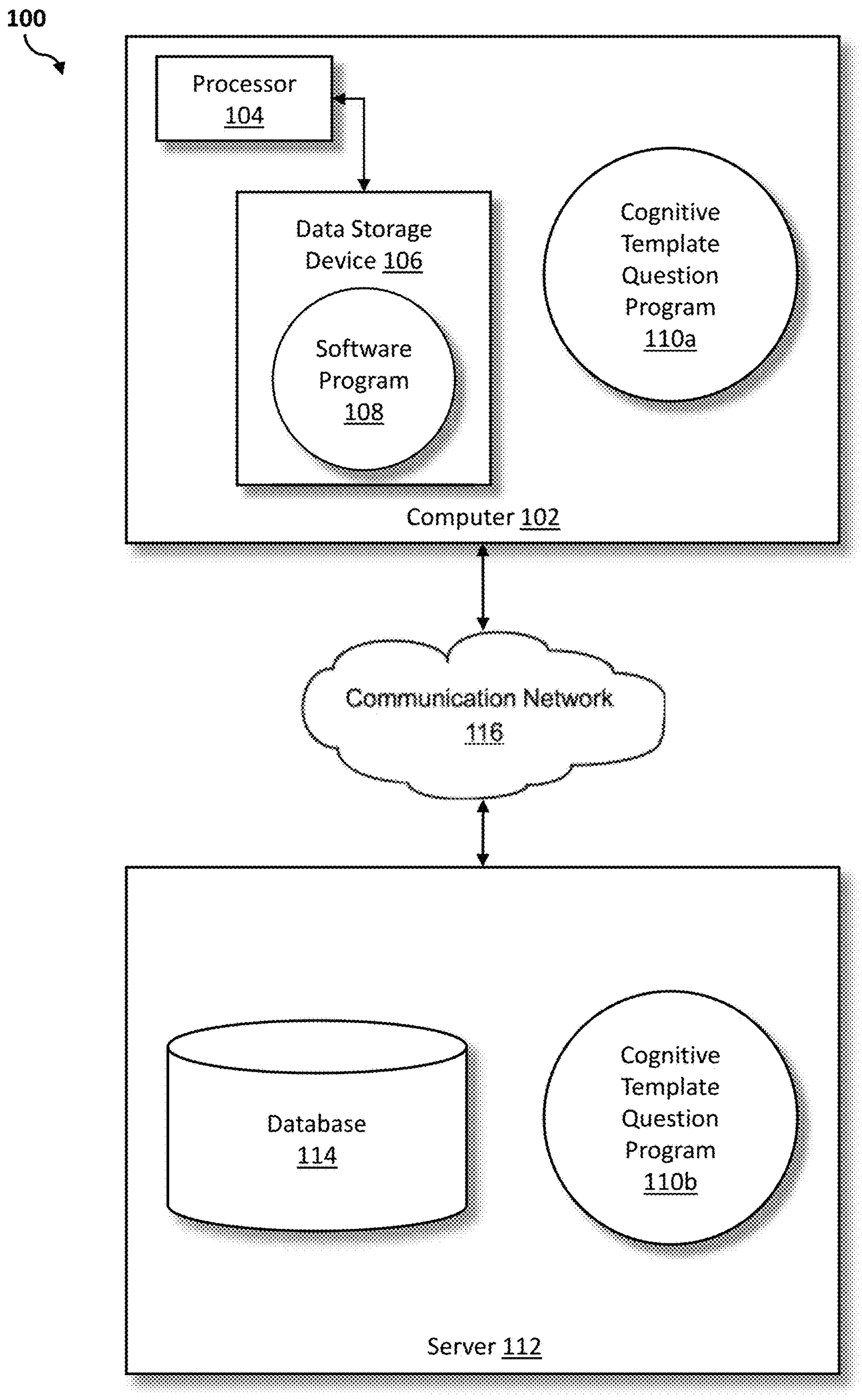
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a cloud ecosystem, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for the formation and execution of cognitive template questions. As such, the present embodiment has the capacity to improve the technical field of cognitive template questions by building and executing template questions in support of semantic reasoning based on type systems, schemas and ontologies. More specifically, a template question is created with missing data and the missing data field is tied to a database. The database continually ingests new data and streaming data by using natural language processing (NLP) and semantic analysis. The template question is populated based on triggering events that the user chooses.

As previously described, cognitive analytics may use a significant amount of stored data and real-time data from various domains. Cyber security, Open Source Intelligence (OSINT) (e.g., from social media), financial markets, medicine and industrial markets are some domains that may generate and provide data. Incorporating the continuous incoming flow of data into semantic reasoning analytics and natural language analytics may provide users with relevant results relating to cognitive template questions.

Computing systems that use semantic reasoning analytics and NLP may be used to incorporate both stored data and an influx of real-time data to assist users in forming relevant questions. Difficulty in forming good questions may become a barrier for users to receive relevant information the user is seeking. Current question and answer (QA) systems may have the ability to ask watched questions automatically, however, the watched questions must be formed manually by the user. Substantial improvements may be made in QA analysis and QA systems, therefore, it may be advantageous to, among other things, provide users with enhanced capabilities of question generation, input and analysis of resulting answers by using a cognitive approach to question generation that allows a user to manually or automatically receive question results based on various triggering events. Question generation capabilities may include, for example, structure, style, policy or other question generation guidelines. Additionally, a cognitive QA system using a type system, schemas, ontologies and databases may be used to populate missing data (i.e., missing fields or missing information) in template question generation and may provide a user with relevant information to the user query. Databases may include various types of databases, for example, structured query language (SQL) databases and not only structured query language (NoSQL) databases (i.e., relational databases or non-relational databases).

Semantic analysis may be used to infer the meaning and intent of language, both verbal and non-verbal. For example, verbal language may include the spoken word captured by a microphone and may be, for example, a streaming input source. Non-verbal language may include, for example, type written words captured in an article (e.g., an online news article or a print news article), a webpage, an email or on a social media account. Semantic analysis may consider an influx of current data and stored historical data for machine learning.

NLP may analyze structured and unstructured data for machine learning and for building a more robust database (e.g., a database for a specific ontology) by ingesting real-time data. This analysis may form a foundation or may provide cognitive insight from more than one perspective (e.g., geospatial, temporal, contextual and relevance). Structured data may include data that is highly organized, such as a spreadsheet or data that is stored in a fixed field. Unstructured data may include data that is not organized and has an unconventional structure, such as a portable document format (PDF), a presentation, a webpage, video content, audio content, an email, a word processing document or multimedia content. The received data may be processed through NLP to extract information that is meaningful to a user creating and using a template question form.

According to at least one embodiment, a cognitive approach to question generation may incorporate existing systems and platforms, such as Watson™ (Watson and all Watson-based trademarks and logos are trademarks or registered trademarks of International Business Machines Corporation and/or its affiliates) and Watson™ DeepQA (Watson DeepQA and all Watson DeepQA-based trademarks and logos are trademarks or registered trademarks of International Business Machines Corporation and/or its affiliates).

Semantic reasoning analytics may ensure a full, accurate, relevant and timely QA hypothesis generation and analysis that may incorporate the most current data available. By continuously ingesting real-time data, a cognitive template question program may dynamically create new observation space centric questions that may enrich and enhance the user experience and interaction with a cognitive QA system, such as Watson. New observation space centric questions may, for example, be based upon a new set of streaming data input into a corpus (e.g., a database) for a particular ontology that is relevant to the template questions. Corpus questions may include, for example:

| Corpus Question Examples |
| --- |
| 1. Am I looking for this? |
| 2. Look what I found? |
| 3. How do these things relate? |
| 4. When will this happen? |
| 5. Is this finding true or is this finding a deception? |
| 6. What do you recommend? |

Natural language QA systems may provide an automatic formation of questions or may assist a user in forming useful questions that are likely to provide relevant information. Relevant information may include, for example, job related information, relational information, medical information, or information relating to the user's current situation. One natural language QA system may include Watson Discovery Advisor™ (Watson Discovery Advisor and all Watson Discovery Advisor-based trademarks and logos are trademarks or registered trademarks of International Business Machines Corporation and/or its affiliates). One other natural language QA system may include Watson™ DeepQA.

Automatic question generation may use a human formed question with missing keywords (i.e., missing data fields) and automatically populate the missing keywords in the template question form. A human formed question may include a question that leaves, for example, the email address part of the question blank and may allow a particular corpus to populate the missing data fields. Automatic question generation may also use a more general regular expression (RegEx) or a similarly expressed question formed using human defined sections and missing words. RegEx may allow a wider word search by using, for instance, part of a word and a special character or special text string as a wildcard.

The cognitive template question system may automatically populate the missing fields from several sources. The keywords may take the form of a defined type in a type system, schema or ontology. A missing keyword may be mapped to a type, a schema or an ontology document related to a database. The database may be relational to the topic the question is attempting to answer. For example, if a cognitive template question with missing keyword types obtains data from a source (i.e., database or corpus) based on a cyber-attack related question, missing types may be populated by the source. A missing type in the cyber-attack related question may include, for example, an email address, the incident, the role (e.g., attacker or victim), and the attack (e.g., malware). An ontology may be used to connect or map relational data, for example, incoming real-time data and stored data in a security related field.

One source that may be used for populating a missing keyword into a template question may include entity extraction tools, such as IBM® Statistical Information and Relation Extraction (SIRE) (IBM Statistical Information and Relation Extraction and all IBM Statistical Information and Relation Extraction-based trademarks and logos are trademarks or registered trademarks of International Business Machines Corporation and/or its affiliates) and Watson™ Knowledge Studio (Watson Knowledge Studio and all Watson Knowledge Studio-based trademarks and logos are trademarks or registered trademarks of International Business Machines Corporation and/or its affiliates). IBM® SIRE and Watson™ Knowledge Studio may detect entity types and relations from various industries, such as security, industrial, medical, automobile and financial.

One other source may include database entries that incorporate a particular table heading. A database may include a database that stores a collection of structured data (e.g., data organized in a table or a spreadsheet) related to various industries. One other source may include a streaming data analytic source to detect words matching a tag (e.g., SGML or XML). Streaming data analytics may continuously gather and process real-time data from external data sources. The received real-time data may be mapped or related, for example, to a tag or a particular industry. Streaming data analytic sources may include databases, messages, log files, sensors, social media posts or IoT devices. A streaming analytics tool may include IBM® InfoSphere® (IBM InfoSphere and all IBM InfoSphere-based trademarks and logos are trademarks or registered trademarks of International Business Machines Corporation and/or its affiliates).

The cognitive template question program may trigger the asking of template questions in response to various types of detected stimulus. Detected stimulus may include arrival of new data in a separate system (e.g., a text message or an event message), updates to a database table, detection of an event or tagged data type in a steaming analytic, a temporal trigger (e.g., a heartbeat) or a manual trigger. A manual trigger may include a pull-down menu in a separate system that offers several automatically formed questions based on data showing, such as data in a user interface (UI) tool. A manual trigger may also include, for example, a visual dynamic question formation tool showing branching options using a dynamic RegEx or similarly expressed template question.

One other type of detected stimulus that triggers the asking of template questions may also include ingestion of new data into the corpus of the cognitive system. Integrating data into the ingestion process may detect certain entities or may detect certain types mentioned that trigger specific questions. Additionally, the cognitive template question program response to a template question may also trigger an alert in some instances. One instance may include when the cognitive template question program response contains a new answer or a higher confidence rating than the previous responses to the same triggered template question. One other instance may include a response that contains specific wording or phrasing not contained in previous responses. One other instance may include a response mentioning a specific entity or relation types not contained in previous responses.

A schema type may be used to analyze whether a collection of data may be used to populate a missing data field (i.e., missing parts of a template). The schema may be types associated with properties. Structured data at rest and streaming structured data may be used. A database update or an update to the corpus may trigger a query. Streaming data may also trigger a query, for example, when a threshold is reached of enough mentions of a particular type, the query may be triggered. Incremental ingest may also trigger an alert, for example, on a quick IBM® SIRE analysis.

Using a type system, schema or ontology communicating with databases that receive and store data may provide more relevant template questions for users. Mention types and databases may use Watson™ Knowledge Studio. Column headings may include a database management system (DMS). Formatting data in a stream may include, for example, SGML or XML tagging and integrating the data with Ground Truth QA capture tool. A template question may be expressed using RegEx. RegEx may encapsulate all variations of a sequence and may be used as an interactive visual aid to the user attempting to form a good question.

The cognitive template question program may interact with SIRE and Watson™ Knowledge Studio to perform new concept detection and creation and annotator capture, for example, associating a concept of a malware attack or beaconing with entities such as BlackEnergy, Rootkit, and Domain Name System (DNS) Tunneling. The associations between a concept and an entity may be dynamic in nature and adaptive learning may assist the Watson™ factoid process to train NLP learning models on new domains a corpus has ingested. The cognitive template question program may ensure a consistent precision of answer responses and utilize a knowledge graph entity with relationship mapping. The generation of new questions may adaptively be accomplished by employing the presented machine learning and cognitive techniques.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cognitive template question program 110*a*. The networked computer environment 100 may also include a server 112 that is enabled to run a cognitive template question program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cognitive template question program 110*a*, 110*b* may interact with a database 114 that may be embedded in various storage devices, such as, but not limited to a computer/mobile device 102, a networked server 112, or a cloud storage service.

According to the present embodiment, a user using a client computer 102 or a server computer 112 may use the cognitive template question program 110*a*, 110*b* (respectively) to apply cognitive analytics to template question generation. The cognitive template question method is explained in more detail below with respect to FIGS. 2 and 3.

Figure 2:
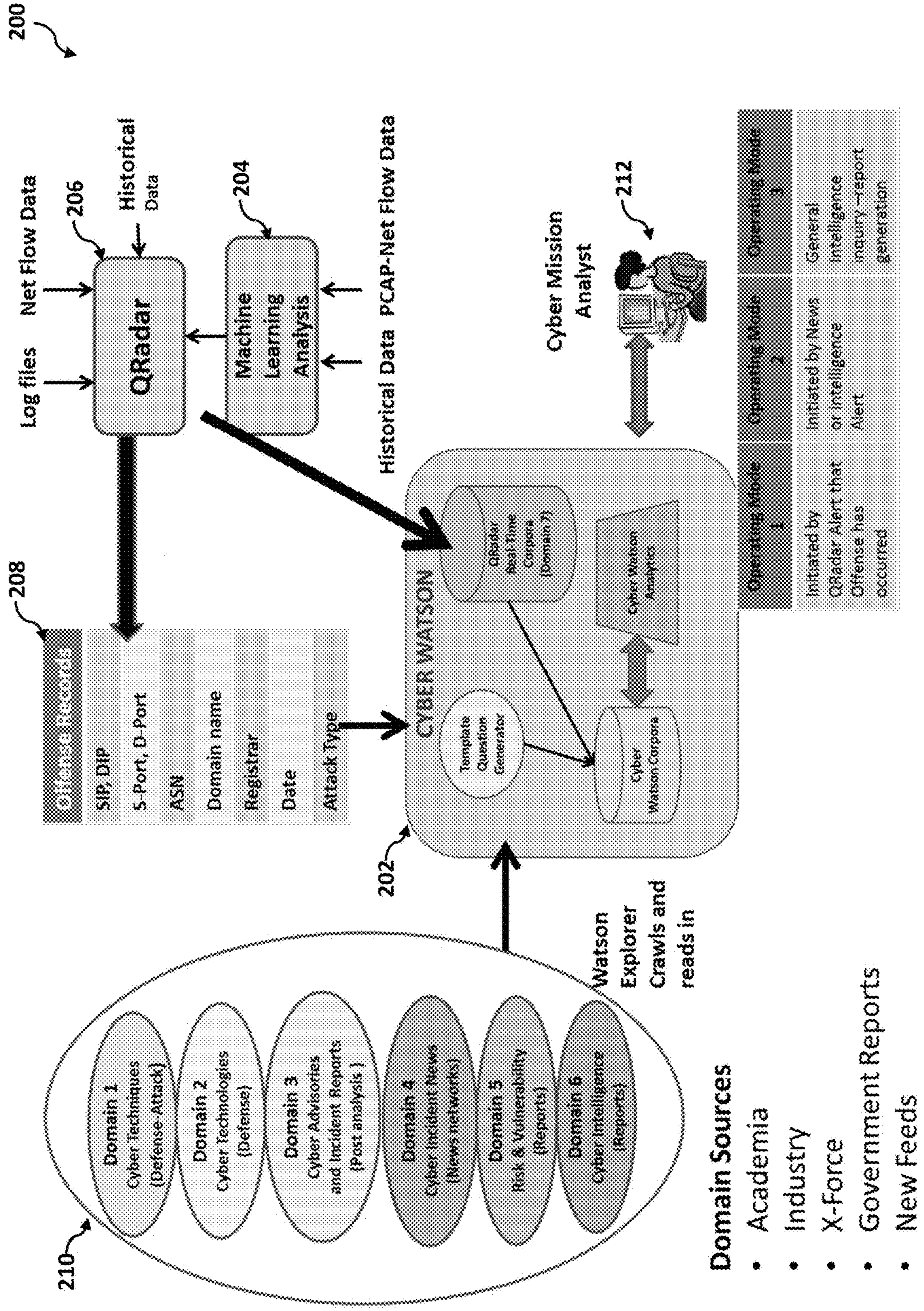
FIG. 2 is a block diagram of an example of a cyber security process flow according to at least one embodiment.

Referring now to FIG. 2, a block diagram of an example of a cyber security process flow 200 used by the cognitive template question program 110*a*, 110*b* according to at least one embodiment is depicted.

The cyber security process flow system 200 includes Cyber Watson™ 202. Cyber Watson™ 202 may include QRadar® (QRadar and all QRadar-based trademarks and logos are trademarks or registered trademarks of International Business Machines Corporation and/or its affiliates), real-time corpora (e.g., a corpus or more than one corpora from each various industries), a template question generator, a cyber Watson™ corpora and cyber Watson™ analytics. The QRadar® system may detect abnormalities and consolidate event logs to correlate data and identify offenses.

A template question generator may generate questions in Cyber Watson™ 202. Template questions may be created by the cyber mission analyst 212 and one example may include special questions that are created dynamically based on QRadar® real-time situational awareness offense records data or behavior discovery. One other example template question may ask if a new Watson™ analysis capability should be built and may use any Watson™ domain to exploit real-time data feeds relevant to the analysis domain. Key data fields, such as Source IP, Source Port, and Behavior may be extracted and used to populate pre-defined question structures. The populated questions may be used to convert structured data outputs from QRadar® and convert unstructured data from, for example, a sensor into a report that Cyber Watson™ 202 can ingest and analyze.

Template questions may refer to one or more data values from a knowledge base (i.e., industry corpus or database 114). The knowledge base may be used to populate the missing data field in a template question. Some terms in a glossary may have synonyms that may also be used to populate missing data fields. Questions grouped by similar types of security issues may go into a general category. Cyber Watson™ 202 template general category question examples are as follows:

| Cyber Watson ™ 202 General Template Questions |
|---|
| 1. Has this <IP address> been identified as the <role> in an <incident> before? |
| 2. Has this <email address> been identified a hosting the <role> in an <incident> before? |
| 3. Has this <domain> been identified as hosting the <role> in an <incident> before? |
| 4. If this attack had been directed at <systems> belonging to <entity> what would have happened? |
| 5. Are any of the <vulnerable><systems> listed in <alert> running <importance> workloads on <systems> belonging to <entity>? |
| 6. Given the targets already affected by the <attack> what is the likelihood of similar attacks against <systems> belonging to <entity>? |
| 7. Given <alert 1> and <alert 2>, which should be handled first by <entity>? |
| 8. Has <entity-individual> been the target of <attack> from <domain> before? |
| 9. Has <entity-individual> been the target of <attack> from <email-address> before? |
| 10. Does the target of <attack> have an unpatched <vulnerability> described in an <vulnerability advisory>? |
| 11. Has <entity> been the target of <attack> before? |
| 12. Has <entity> reported any unexplained <resource> availability issues during <time period>? |

Cyber Watson™ 202 glossary types may be stored historical data and data stored in real-time from continuous information being streamed into a corpus. A table of glossary types, for example, may be represented as follows:

| Type | Definition |
|---|---|
| IP Address | IP address; IPv4 is w.x.y.z, while IPv6 is . . . |
| source | |
| source address | |
| source IP | |
| source IP address | |
| destination | |
| destination address | |
| destination IP | |
| destination IP address | |
| port number | Integer 1-65535 |
| email address | A valid email address |
| from {email address} | |
| to {email address} | |
| domain | |
| domain name | |
| role | Attacker, target, intermediate, bot, zombie, or phisher. |
| incident | An instance of some event that has been seen before. |
| vulnerability | An instance of a known vulnerability, identified by a CVE# or other. |
| attack | SQL-iniection, malware, APT, bot recruitment or spoofing. |

Machine learning analysis 204 may be incorporated into the cyber security process flow 200 by providing a continuous influx of data into the system to create a more robust cyber security analytics system. The influx of data may include historical data and packet capture (PCAP) net flow data. QRadar 206 historical data may include cyber security analytics, such as log files, net flow data, historical data, and real-time data relating to security. For example, QRadar 206 may provide a cognitive security analytics and intelligence to Cyber Watson 202.

Offense records 208 may be used by the cognitive template question program 110*a*, 110*b* to search one or more corpora of records using various search parameters. Offense records 208 may receive QRadar 206 historical data and real-time data streaming from outside sources (e.g., Internet of Things (IoT) devices). Offense records 208 may include, for example, session initiation protocol (SIP), density inference protocol (DIP), serial port (S-Port), D-Port diagnostics, anonymous system number (ASN), domain name, registrar, date and attack type. The offense records 208 may feed data into Cyber Watson™ 202.

Domains 210 may include cyber techniques relating to defense attacks, cyber technologies related to defense, cyber advisories and incident reports for post analysis considerations, cyber incident news from news networks, risk and vulnerability reports and cyber intelligence reports. Domain 210 sources may include academia, industry, government reports, news feeds and IBM® X-Force® (IBM X-Force and all IBM X-Force-based trademarks and logos are trademarks or registered trademarks of International Business Machines Corporation and/or its affiliates).

A cyber mission analyst 212 may be an individual who sets an alert to refresh or manually refreshes how often the template questions are processed by Cyber Watson™ 202. A template question alert may be set by the cyber mission analyst 212 to be initiated by the QRadar real-time corpora each time an offense has occurred. A template question may be initiated by, for example, news or an intelligence alert. Additionally, a template question may be initiated as a general intelligence inquiry and a report generation request may be made by the cyber mission analyst 212.

QRadar® offense record and behavior data may be streamed continuously or partitioned into batches into Cyber Watson™ 202. A new question into the Cyber Watson™ 202 corpora based on real-time cyber situational awareness and activities or events hitting an enterprise may be instantiated. The instantiated questions may augment the standard questions already prebuilt and used to train Cyber Watson™ 202.

Figure 3:
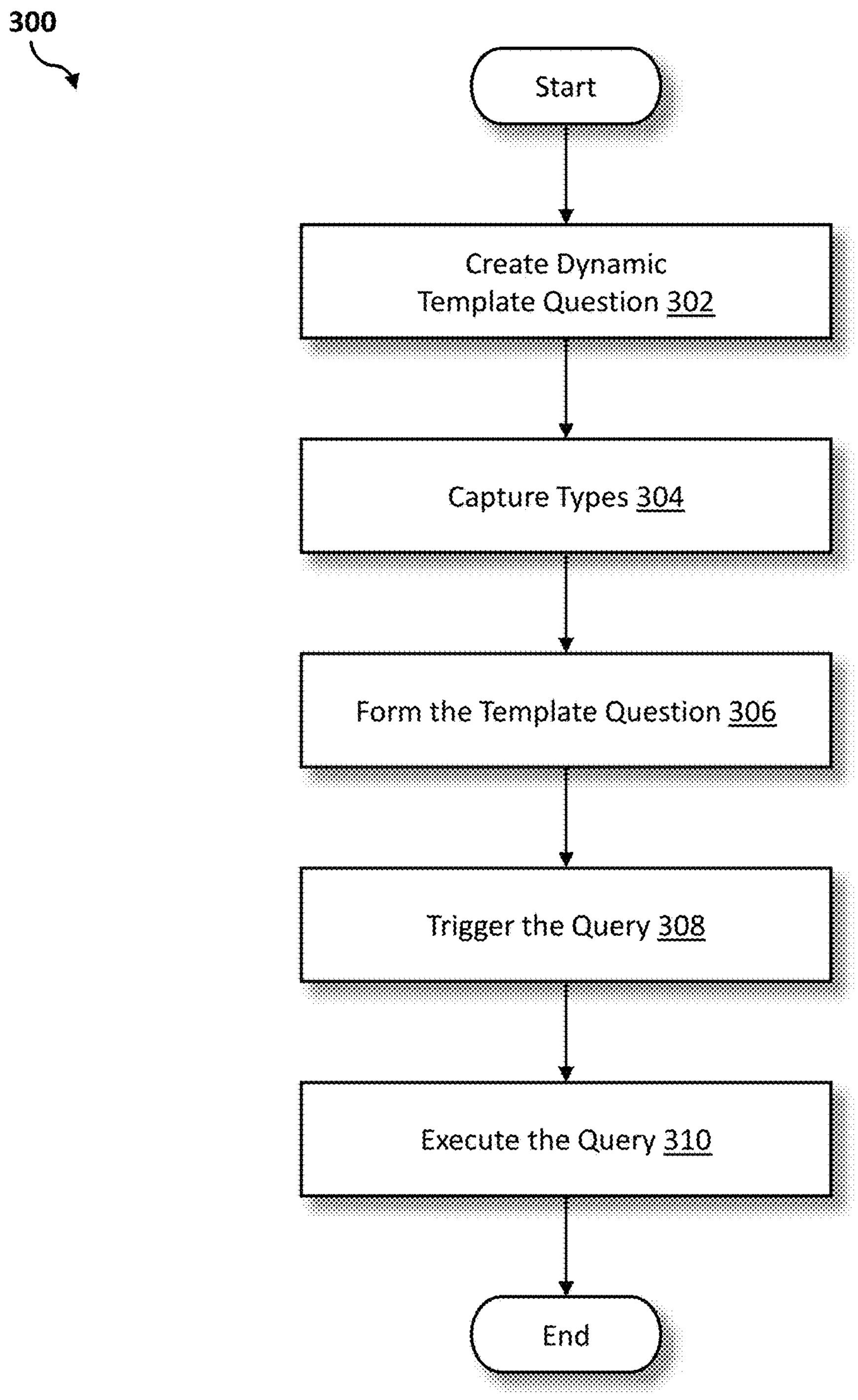
FIG. 3 is an operational flowchart illustrating a process for cognitive template question formation and execution according to at least one embodiment.

Referring now to FIG. 3, an operational flowchart illustrating the exemplary cognitive template question formation and execution process 300 used by the cognitive template question program 110*a*, 110*b* according to at least one embodiment is depicted.

At 302, a dynamic template question is created. A user may manually build or create a template question. The template question may be a static or a RegEx dynamic template question. The template question may be created with unpopulated data fields (i.e., missing information) in a question. The template question may have one or more questions with one or more unpopulated data fields. The template question may be created based on various ontologies or industries (e.g., cyber security, financial or medicine) and may be linked to one corpus (e.g., a cyber security database) or more than one corpora. The template question may be stored on a user computer (e.g., computer 102) and communicate to corpora via a communication network 116.

For example, a user creates a cyber security related dynamic template question to query for the identity of an attacker in a specific type of attack or incident. The user may enter the following question to create a template form:

Has <email address> been identified as the <role> in a <type of incident>?

The email address may be considered a type, the role may be an attacker or a victim, and the type of incident may be a malware attack. The user may tie the missing data fields to particular types using a natural language processing system to identify, for example, the types and the roles in the system. An alternate embodiment may use a QA capture tool or a Ground Truth tool for incoming data streams. Incoming data streams may keep building the database information.

Next, at 304, types are captured. Types may be captured, for example, from NLP system types, database management systems (DMS) headings or streaming tags. The user may map (i.e., tie, associate or link) the created template question to a data source, such as a cyber security database that has stored fields or tables (e.g., spreadsheets) that correspond to types and roles. A cyber security corpus example may include IBM® Cognitive Security (IBM Cognitive Security and all IBM Cognitive Security-based trademarks and logos are trademarks or registered trademarks of International Business Machines Corporation and/or its affiliates). Continuing from the previous example, the created template question is mapped to the cyber security database that corresponds to the types on a table that lists email addresses, a table that lists role identifications of an attacker or a victim and a table that corresponds to a type of incident. The type of incident may include, for example, a malware attack, a botnet attack, a ransomware attack or a virus infestation.

Then at 306, the template question is formed. The template question mapped to the data source may be formed by a NLP system, a RDMS or a streaming system populating the missing information into the created dynamic question template. Continuing from the previous example, after mapping the template question to a database, the created dynamic question would now read as follows:

Has hacker@computervirus.com been identified as the attacker in a malware attack?

The unpopulated data fields were, for example, populated in the dynamic question template that was tied to a cyber security database using NLP.

Next, at 308, a query is triggered. The query may be triggered by a triggering event that may be created to be an automatic trigger or a manual trigger. The user may choose the desirable trigger for the unpopulated data fields to be populated in a template question. Triggering events, for example, may include the arrival of new data in a separate system (e.g., a text message or an event message), updates to a database table, detection of an event or tagged data type in a steaming analytic, a temporal trigger (e.g., a heartbeat) or a manual trigger. A manual trigger may include, for example, a visual dynamic question formation tool showing branching options using a dynamic RegEx or similarly expressed template question.

For example, the user sets the template question query to trigger each time the cyber security database is updated, causing the template question to be populated each time the cyber security database receives new data. A database 114 or corpus may receive new real-time input from various sources (e.g., sensors, IoT devices, email messages or social media data). Continuing from the previous example, once a new input is received by the cyber security database, the template question is triggered. The trigger may ask the template question for each new email address that appears in the corpus or database. Each time a new email address is entered into the database 114, the cognitive template question program 110*a*, 110*b* may be triggered to ask the created question, for example, of whether or not each of the new email addresses has been used as the attacker and the victim in multiple incident types.

One other type of detected stimulus that may trigger the query may include an alert, in some instances. An alert, for example, may include a news story, and the trigger may not be initiated until a predefined threshold is met. A predefined threshold may, for example, include a confidence rating being sufficiently high. A sufficiently high confidence rating may be set by the user to include, for example, a certain number of responses by the public to a news story or instances when the alert contains specific words, phrases, entities or relation types. A schema type may also be used to analyze whether a collection of data may be used to populate missing data fields in a dynamic template question. A schema may include types associated with properties.

Then, at 310, a query is executed. The cognitive template question program 110*a*, 110*b* may produce an alert when a query is executed. An alert may include a message (e.g., email message, popup alert or a text message) to the user that the query has been executed. An alert may also provide the executed query to the user or may direct the user to the results of the query. For example, the cognitive template question program 110*a*, 110*b* sends a message to the cyber mission analyst 212 that a new email address has been input into the cyber security database and the results of the executed query are presented.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
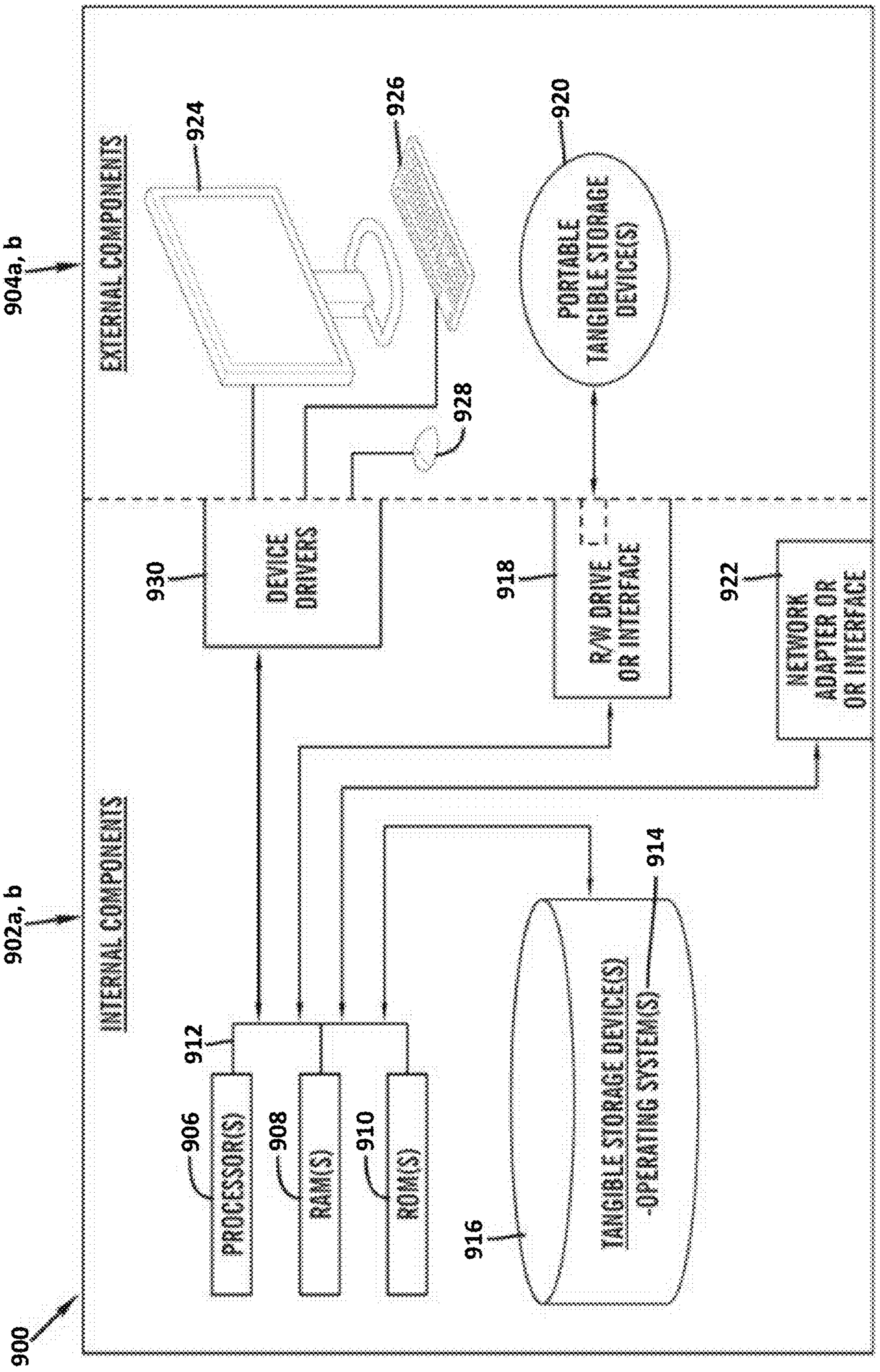
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the cognitive template question program 110*a* in client computer 102, and the cognitive template question program 110*b* in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cognitive template question program 110*a*, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the cognitive template question program 110*a* in client computer 102 and the cognitive template question program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cognitive template question program 110*a* in client computer 102 and the cognitive template question program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
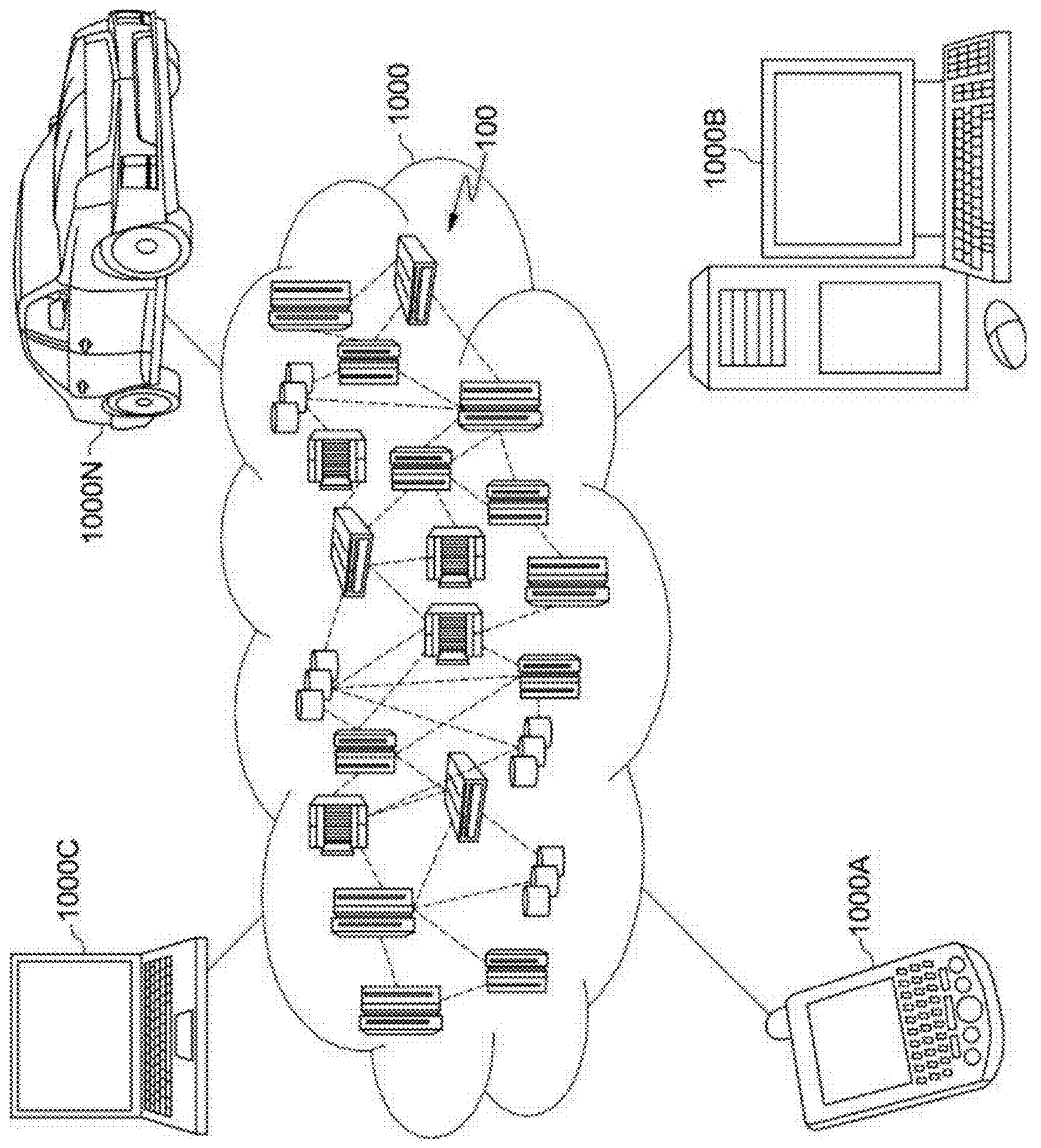
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
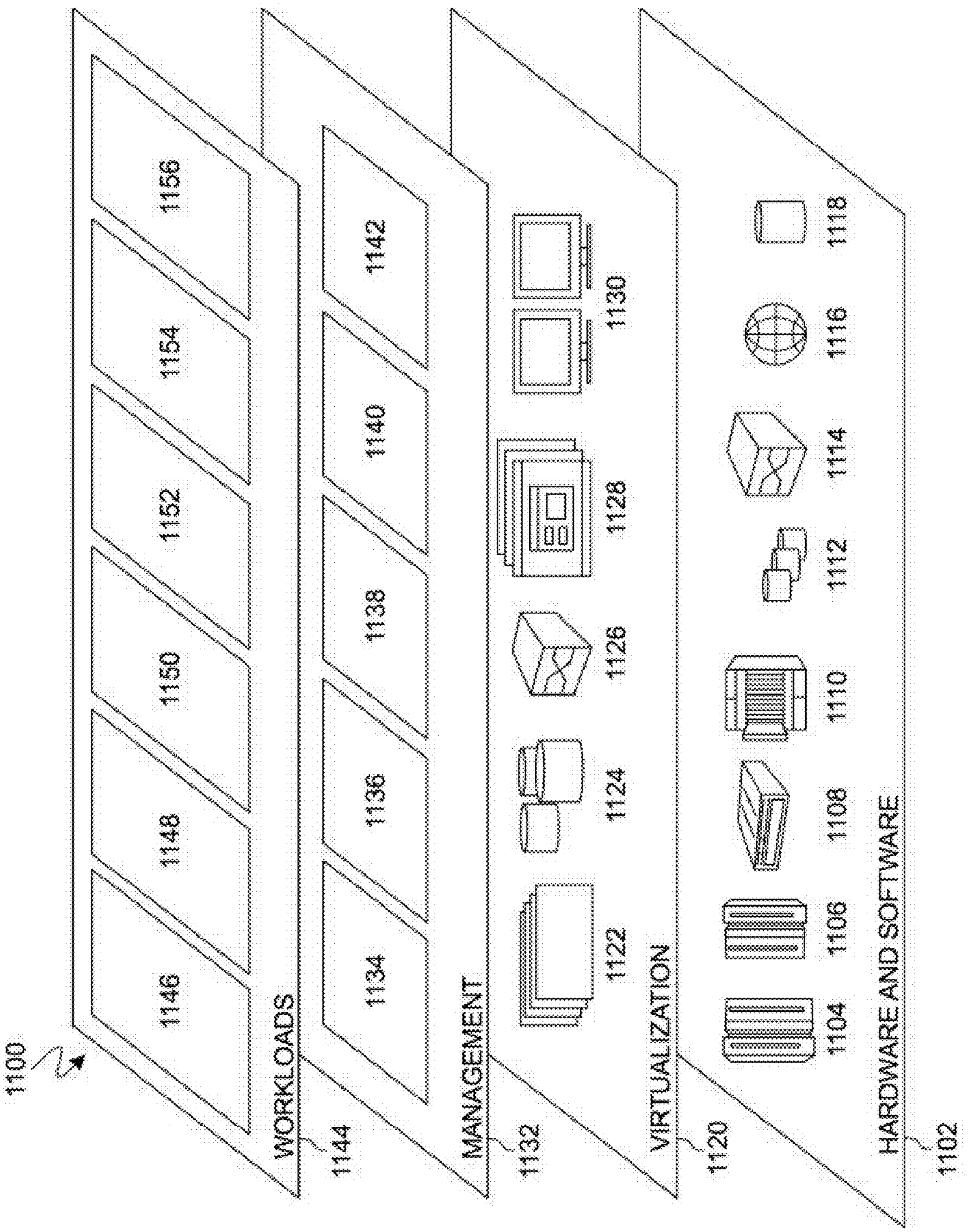
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and cognitive template question formation and execution 1156. A cognitive template question program 110*a*, 110*b* provides a way to provide users with enhanced question generation capabilities with the ability to trigger the question generation system using more than one method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for building and executing a cognitive template question, the method comprising:

receiving a dynamic template question with one or more missing data fields;

mapping the received dynamic template question to a type;

mapping the received dynamic template question to a data source;

forming a template question based on the mapped dynamic template question, wherein the one or more missing data fields are populated, wherein one or more missing data fields are additionally populated with synonymous terms;

identifying a public alert relating to the dynamic template question that has a rating that exceeds a predetermined threshold;

triggering, in response to a triggering event, a query based on the formed template question; and executing the triggered query, wherein the triggered query converts structured data and unstructured data into a response.

2. The method of claim 1, wherein the dynamic template question is created by a user.

3. The method of claim 1, wherein the type is related to a plurality of data, and wherein the plurality of data is stored on a database for a particular ontology related to the received dynamic template question.

4. The method of claim 1, wherein the data source is a database or a streaming data analytic source.

5. The method of claim 1, wherein a user creates a trigger, and wherein the trigger is created as an automatic trigger or a manual trigger.

6. The method of claim 1, wherein executing the triggered query is based on an occurrence of the triggering event, wherein the triggering event is selected from the group consisting of the ingestion of a plurality of new data to a database, an arrival of a plurality of new data in a separate system, an update to a database table, a detection of a tagged data type in a streaming analytic event, and a temporal trigger.

7. The method of claim 1, wherein the triggering event includes a cognitive template question program response that contains a new answer or a higher confidence rating answer that one or more previous responses to the same triggered template question did not have.

8. A computer implemented system for building and executing a cognitive template question, comprising:

one or more processors, one or more computer-readable memories, one or more non-transitory computer-readable tangible storage media, and program instructions stored on at least one of the one or more tangible storage media for execution by at least one of the one or more processors via at least one of the one or more computer-readable memories, wherein the computer system performs a method comprising:

receiving a dynamic template question with one or more missing data fields;

mapping the received dynamic template question to a type;

mapping the received dynamic template question to a data source;

forming a template question based on the mapped dynamic template question, wherein the one or more missing data fields are populated, wherein one or more missing data fields are additionally populated with synonymous terms;

identifying a public alert relating to the dynamic template question that has a rating that exceeds a predetermined threshold;

triggering, in response to a triggering event, a query based on the formed template question; and executing the triggered query, wherein the triggered query converts structured data and unstructured data into a response.

9. The computer system of claim 8, wherein the dynamic template question is created by a user.

10. The computer system of claim 8, wherein the type is related to a plurality of data, and wherein the plurality of data is stored on a database for a particular ontology related to the received dynamic template question.

11. The computer system of claim 8, wherein the data source is a database or a streaming data analytic source.

12. The computer system of claim 8, wherein a user creates a trigger, and wherein the trigger is created as an automatic trigger or a manual trigger.

13. The computer system of claim 8, wherein executing the triggered query is based on an occurrence of the triggering event, wherein the triggering event is selected from the group consisting of the ingestion of a plurality of new data to a database, an arrival of a plurality of new data in a separate system, an update to a database table, a detection of a tagged data type in a streaming analytic event, and a temporal trigger.

14. The computer system of claim 8, wherein the triggering event includes a cognitive template question program response that contains a new answer or a higher confidence rating answer that one or more previous responses to the same triggered template question did not have.

15. A computer program product for building and executing a cognitive template question, comprising:

one or more computer-readable storage media and program instructions stored on at least one of the one or more tangible storage media, the program instructions executable by a processor to cause the processor to perform a method comprising:

receiving a dynamic template question with one or more missing data fields;

mapping the received dynamic template question to a type;

mapping the received dynamic template question to a data source;

forming a template question based on the mapped dynamic template question, wherein the one or more missing data fields are populated, wherein one or more missing data fields are additionally populated with synonymous terms;

identifying a public alert relating to the dynamic template question that has a rating that exceeds a predetermined threshold;

triggering, in response to a triggering event, a query based on the formed template question; and executing the triggered query, wherein the triggered query converts structured data and unstructured data into a response.

16. The computer program product of claim 15, wherein the dynamic template question is created by a user.

17. The computer program product of claim 15, wherein the type is related to a plurality of data, and wherein the plurality of data is stored on a database for a particular ontology related to the received dynamic template question.

18. The computer program product of claim 15, wherein the data source is a database or a streaming data analytic source.

19. The computer program product of claim 15, wherein a user creates a trigger, and wherein the trigger is created as an automatic trigger or a manual trigger.

20. The computer program product of claim 15, wherein executing the triggered query is based on an occurrence of the triggering event, wherein the triggering event is selected from the group consisting of the ingestion of a plurality of new data to a database, an arrival of a plurality of new data in a separate system, an update to a database table, a detection of a tagged data type in a streaming analytic event, and a temporal trigger.

* * * * *